United States Patent
Kreuder et al.

(10) Patent No.: US 9,418,135 B2
(45) Date of Patent: Aug. 16, 2016

(54) PRIMARY DATABASE SYSTEM, REPLICATION DATABASE SYSTEM AND METHOD FOR REPLICATING DATA OF A PRIMARY DATABASE SYSTEM

(75) Inventors: Heinz Kreuder, Messel (DE); Harald Schöning, Dieburg (DE); Gerhard Schumacher, Einhausen (DE); Hans-Jürgen Thun, Darmstadt (DE)

(73) Assignee: SOFTWARE AG, Darmstadt (DE)

( * ) Notice: Subject to any disclaimer, the term of this patent is extended or adjusted under 35 U.S.C. 154(b) by 172 days.

(21) Appl. No.: 12/923,134

(22) Filed: Sep. 3, 2010

(65) Prior Publication Data
US 2011/0087633 A1    Apr. 14, 2011

(30) Foreign Application Priority Data
Oct. 9, 2009   (EP) ..................................... 09172631

(51) Int. Cl.
G06F 17/30   (2006.01)
(52) U.S. Cl.
CPC ................................ G06F 17/30578 (2013.01)
(58) Field of Classification Search
CPC .............................. G06F 11/446; G06F 11/448
USPC .................. 707/610, 655, 674, 704, E17.005
See application file for complete search history.

(56) References Cited

U.S. PATENT DOCUMENTS

| 5,452,445 | A |   | 9/1995  | Hallmark et al. |
|-----------|---|---|---------|-----------------|
| 5,555,388 | A | * | 9/1996  | Shaughnessy .... G06F 17/30171 707/999.002 |
| 5,845,292 | A | * | 12/1998 | Bohannon et al. |
| 6,052,695 | A | * | 4/2000  | Abe et al.      |
| 7,139,927 | B2 | * | 11/2006 | Park et al. ...................... 714/4.1 |
| 7,254,683 | B2 | * | 8/2007  | Burton et al. .................. 711/162 |
| 7,299,378 | B2 | * | 11/2007 | Chandrasekaran et al. .... 714/15 |

(Continued)

FOREIGN PATENT DOCUMENTS

| EP | 0 420 425    | 4/1991  |
|----|--------------|---------|
| WO | 03/081467    | 10/2003 |
| WO | WO 03/081467 | 10/2003 |

OTHER PUBLICATIONS

Richard P. King et al., "Management of a Remote Backup Copy for Disaster Recovery," ACM Transactions on Database Systems, vol. 16, No. 2, Jun. 1991, pp. 338-368, ISSN 0362-5915.

(Continued)

Primary Examiner — Baoquoc N To
(74) Attorney, Agent, or Firm — Nixon & Vanderhye PC

(57) ABSTRACT

Embodiments of the present disclosure are directed to a database system and methods for storing and replicating data of a primary database. A method for replicating data item may include receiving replication data from a primary database system and replicating the one or more data items of the primary database system in accordance with the replication data. The replication data may include a transaction log including information on transactions processed by the primary database system and database lock data relating to at least one lock on the one or more data items of the primary database system in order to support simultaneous queries to the primary and replication database systems. The method may also include rolling-back the replication data in the at least one replication database system based on the information on transactions processed by the primary database system and the database lock data.

21 Claims, 7 Drawing Sheets

(56) References Cited

U.S. PATENT DOCUMENTS

Figure 1:
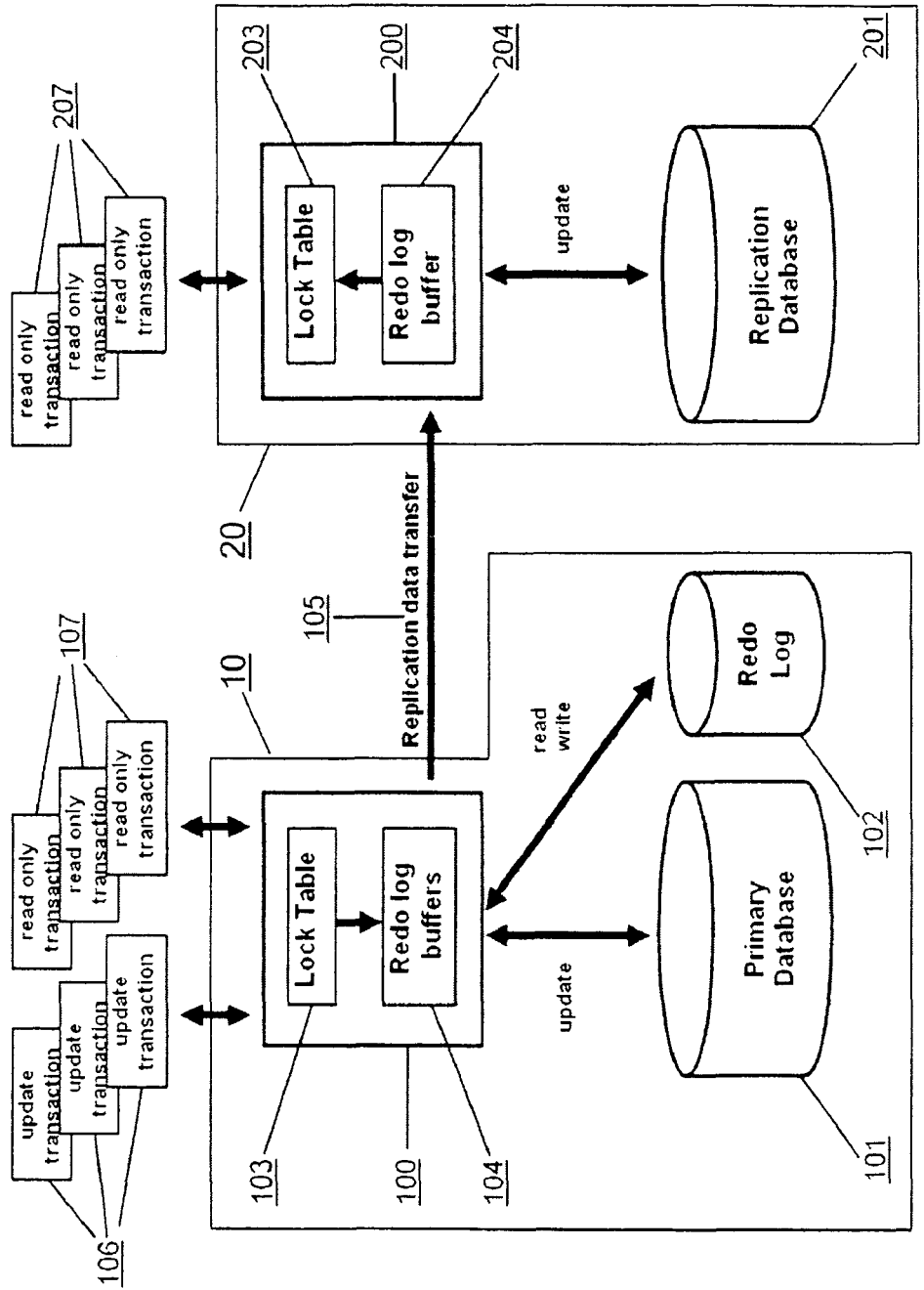

| | | | |
|---|---|---|---|
| 7,330,858 B1* | 2/2008 | Karr | G06F 3/0611 |
| 7,844,584 B1* | 11/2010 | Griess | 707/704 |
| 7,962,458 B2* | 6/2011 | Holenstein et al. | 707/704 |
| 8,301,593 B2* | 10/2012 | Hoffmann et al. | 707/615 |
| 2003/0212864 A1* | 11/2003 | Hicken | G06F 11/2092 711/122 |
| 2003/0220935 A1* | 11/2003 | Vivian et al. | 707/102 |
| 2004/0078658 A1* | 4/2004 | Park et al. | 714/16 |
| 2004/0225915 A1* | 11/2004 | Johnson et al. | 714/13 |
| 2008/0160315 A1* | 7/2008 | Forray et al. | 428/411.1 |
| 2009/0210429 A1* | 8/2009 | Agrawal et al. | 707/10 |
| 2009/0313311 A1* | 12/2009 | Hoffmann et al. | 707/204 |
| 2010/0250491 A1* | 9/2010 | Jin et al. | 707/634 |

OTHER PUBLICATIONS

Frank Lars, "Evaluation of the Basic Remote Backup and Replication Methods for High Availability Databases," Software—Practice and Experience, Accepted Jul. 27, 1999, pp. 1339-1353, ISSN 0038-0644.

Frank, "Evaluation of the Basic Remote Backup and Replication Methods for High Availability Databases," Softw. Pract. Exper. 29(15), pp. 1339-1353, 1999.

King et al., "Management of a Remote Backup Copy for Disaster Recovery," ACT Transactions on Database Systems, vol. 16, No. 2, Jun. 1991, pp. 338-368.

Leverenz et al. "Data Replication" Oracle8i Concepts, vol. 2, Release 8.1.5, 19 pages (Feb. 1999).

* cited by examiner

PRIMARY DATABASE SYSTEM, REPLICATION DATABASE SYSTEM AND METHOD FOR REPLICATING DATA OF A PRIMARY DATABASE SYSTEM

This application claims the benefit of European Patent Application No. EP 09 172 631.5 filed Oct. 9, 2009, the content of which is incorporated by reference herein in its entirety.

1. TECHNICAL FIELD

The present invention relates to a primary database system, a replication database system and a method for replicating data items of a primary database system.

2. THE PRIOR ART

Database systems are commonly used for storing, modifying and querying large amounts of data used within modern computing environments. An unexpected crash or inconsistency in such database systems, e.g. due to hardware or network failures, can result in enormous system down-time of the computing environment, since the data on which the computing environment operates may be lost or corrupted. The reliability and availability of database systems is thus of eminent importance. To this end, in addition to the processing of requests for storing, modifying and querying data (transaction processing), a database system may replicate its data at one or more replication database systems (replication processing).

In case of failure of the (primary) database system, the lost data may then be restored from the replication database system(s), i.e. the latter serve as stand-by backup storages. In this failure-recovery use case, transaction processing is typically only performed by the primary database system and the replication database systems only participate in the replication processing.

However, replication database systems may also be employed in other scenarios, e.g. for the mobile use of data. Here, a replication database system may be located on a mobile device such as a laptop or a smartphone and synchronize in regular intervals with a primary database system on a central server. In this use case, transaction processing may be performed directly on the replication database system in order to increase performance.

Yet another important use case is using replication database systems for load balancing, i.e. for performing transaction processing by the primary and replication database systems simultaneously to also increase the performance of the transaction processing.

However, if data of a replication database system is queried during transaction processing while a replication processing is in progress, the query may obtain inconsistent results. This is since the query processing may retrieve intermediate data that may change during the course of the replication processing (a phenomenon known as 'dirty reads'). In order to overcome this problem, it is known to allow query processing and replication processing only in different time slots, thereby guaranteeing that only consistent data can be queried. However, this approach comes at the cost of reduced performance, since query processing has to be postponed until any replication processing is finished, which is especially disadvantageous in the context of load balancing. Alternatively, simultaneous query processing and replication processing may be allowed for better performance, however, at the cost that consistency cannot be guaranteed.

Furthermore, it may be desirable in certain scenarios to not only simultaneously query the data of the primary and replication database systems, but to also allow simultaneous modifications on the different data copies stored in the primary and replication database systems. Here, an additional problem is that the different data copies may transition to an unsynchronized, inconsistent state. To this end, it is known to employ complex mechanisms for detecting and resolving inconsistent data within the primary and replication databases. Alternatively, synchronous replication techniques may be used for preventing inconsistent data modifications in the first place (e.g. using the known two-phase commit protocol). However, these approaches also come at the cost of reduced performance due to the overhead of conflict resolution or synchronous replication.

It is therefore the technical problem underlying the present invention to provide a database replication technique that allows an efficient and consistent transaction processing, thereby at least partly overcoming the above explained disadvantages of the prior art.

3. SUMMARY OF THE INVENTION

This problem is according to one aspect of the invention solved by a method for replicating one or more data items of a primary database system in accordance with claim 1, wherein the method comprises the following steps performed by the primary database system:

a. providing replication data to at least one replication database system, the replication data being usable for replicating the one or more data items of the primary database system by the at least one replication database system; and b. adding lock data to the replication data sent in step a., wherein the lock data relates to at least one lock on the one or more data items.

Accordingly, replication data is provided in step a. by a primary database system to be used by at least one replication database system to replicate one or more data items of the primary database system. As a result, the at least one replication database system is enabled to obtain a local copy of the one or more data items of the primary database system. To this end, the primary database system may store the replication data and the at least one replication database system may request the stored replication data. Furthermore, the primary database system adds lock data to the replication data sent in step a. to the at least one replication database system, wherein the lock data relates to at least one lock on the one or more data items.

Such locks may be created by the primary database system when creating, modifying, deleting and/or querying one or more data items in response to a transaction received by the primary database system and generally serve for restricting the access of other transactions to the one or more data items, when being processed by the primary database system. By supplementing the replication data sent to the at least one replication database system with locking data relating to these locks, the at least one replication database system is enabled to also process one or more transactions in accordance with the received lock data and preferably simultaneously to any replication processing and/or transaction processing performed by the primary database system. Consequently, it is ensured that transactions are processed by the at least one replication database system in an efficient yet transaction-consistent manner, as will be explained further below.

In synchronous replication techniques known from the prior art, the primary database system has to wait until the sent replication data is confirmed by the at least one replication database system. In other words, the primary database system cannot process any further transactions until the replication data has been processed by the at least one replication database system. The present invention departs from this concept in that an asynchronous replication technique is provided, i.e. the primary database system can perform its transaction processing in parallel and independently from the replication processing. This is because the consistency is ensured by the at least one replication database system based on the received lock data related to the one or more data items to be replicated.

Since lock data restricts the access of a transaction to one or more data items, the efficiency of the at least one replication database system can be further improved by minimizing the amount of locking data transferred from the primary database system to the at least one replication database system. In other words, the amount of transferred locking data should be reduced to the necessary minimum.

Accordingly, in one aspect of the invention, the lock data may be added to the replication data provided in step a., only if the at least one lock is requested by an update transaction received by the primary database system. An update transaction is a transaction that creates, modifies or deletes one or more data items, as opposed to a read-only transaction that only queries one or more data items (without changing them). While both types of transactions may acquire locks on one or more data items, locks relating to read-only transactions are preferably not added to the replication data. Still, the processing of read-only transactions by the at least one replication database system in a transaction-consistent manner is ensured, since the at least one replication database system has the locks relating to update transactions available.

In another aspect, the lock data may be added to the replication data provided in step a., only if the related at least one lock is an exclusive lock. Accordingly, the present invention supports different kinds of locks, e.g. exclusive locks, shared locks, etc. known from the prior art. However, locking data relating to shared locks is preferably not added to the replication data, since such shared locks cannot cause conflicts with the processing of the at least one replication database. Consequently, the amount of lock data transferred is further minimized, thereby increasing on the one hand the efficiency of the at least one replication database system and on the other hand the efficiency of the primary database system, since it has to process only the necessary minimum of replication data.

According to yet another aspect of the invention, the lock data may be added to the replication data provided in step a., only if the one or more data items related to the at least one lock have been modified during a processing of an update transaction by the primary database system. Since locks relating to one or more data items that are not modified during the processing of a transaction by the primary database system cannot cause conflicts at the at least one replication database system, such locks are omitted from the transferred replication data in order to further decrease the amount of transferred lock data.

In a further aspect, step b. may be only performed, if at least one replication database system adapted for simultaneous queries is registered at the primary database system, as will be further explained in the detailed description below.

The present invention also relates to a method for replicating one or more data items of a primary database system by a replication database system in accordance with claim 5, wherein the method comprises the following steps performed by the replication database system:

a. receiving replication data from the primary database system and replicating the one or more data items of the primary database system in accordance with the replication data;

b. wherein the replication data received in step a. comprises lock data relating to at least one lock on the one or more data items.

Accordingly, as already explained above, the replication database may use the received lock data for processing one or more transactions, preferably read-only transactions, so that the one or more transactions are processed in a transaction-consistent manner, preferably simultaneously to any replication processing and/or independently from any transaction processing of the primary database system.

In another aspect, the lock data may relate to at least one exclusive lock on the one or more data items, at least one read-only transaction may request a second lock on the one or more data items and the method may comprise the step of postponing a processing of the at least one read-only transaction until the at least one exclusive lock is released by the replication database system. Accordingly, in case a read-only transaction is to be processed by the replication database system that serves for reading data items already exclusively locked (e.g. while a replication transaction is in progress), the read-only transaction is forced to wait until the exclusive lock is released (e.g. at the end of the replication transaction). In other words, replication processing takes precedence over transaction processing by the replication database system for the sake of best overall performance.

According to yet another aspect of the invention, the replication database system may request a third lock for replication purposes on the one or more data items, wherein the third lock may be already held by the at least one read-only transaction and wherein the method may comprise the further step of forcing the at least one read-only transaction to release the third lock, e.g. by a rollback of the at least one read-only transaction. Accordingly, situations may occur where the replication database system intends to acquire a lock on certain data items for replicating them, while the data items are already locked by a read-only transaction currently in progress. In particular if the read-only transaction itself intends to acquire a lock that is already held by the replication database system, each of the two entities would have to wait for the other to release the corresponding lock (a phenomenon referred to as 'cyclic waiting' or 'deadlock'). In order to resolve this situation, the replication database system may force the read-only transaction to release the lock by a rollback, so that the read-only transaction may be restarted, possibly at a later stage.

In summary, the replication database system can be effectively used for load-balancing, i.e. for serving read-only transactions simultaneously to the primary database system.

The present invention further concerns a primary database system, comprising a primary database server adapted for sending replication data to at least one replication database system to be used for replicating one or more data items of the primary database system by the at least one replication database system, wherein the replication data comprises lock data relating to at least one lock on the one or more data items.

Furthermore, a replication database system is provided, comprising a replication database server adapted for receiving replication data from a primary database system and for replicating one or more data items of the primary database system in accordance with the replication data, wherein the replication data comprises lock data relating to at least one lock on the one or more data items.

Further advantageous modifications of embodiments of the primary database system and the replication database system of the invention are defined in further dependent claims.

The present invention is further directed to a system comprising a primary database system and at least one replication database system as described above. Lastly, the present invention provides a computer program comprising instructions adapted for implementing any of the above methods.

4. SHORT DESCRIPTION OF THE DRAWINGS

Figure 2:
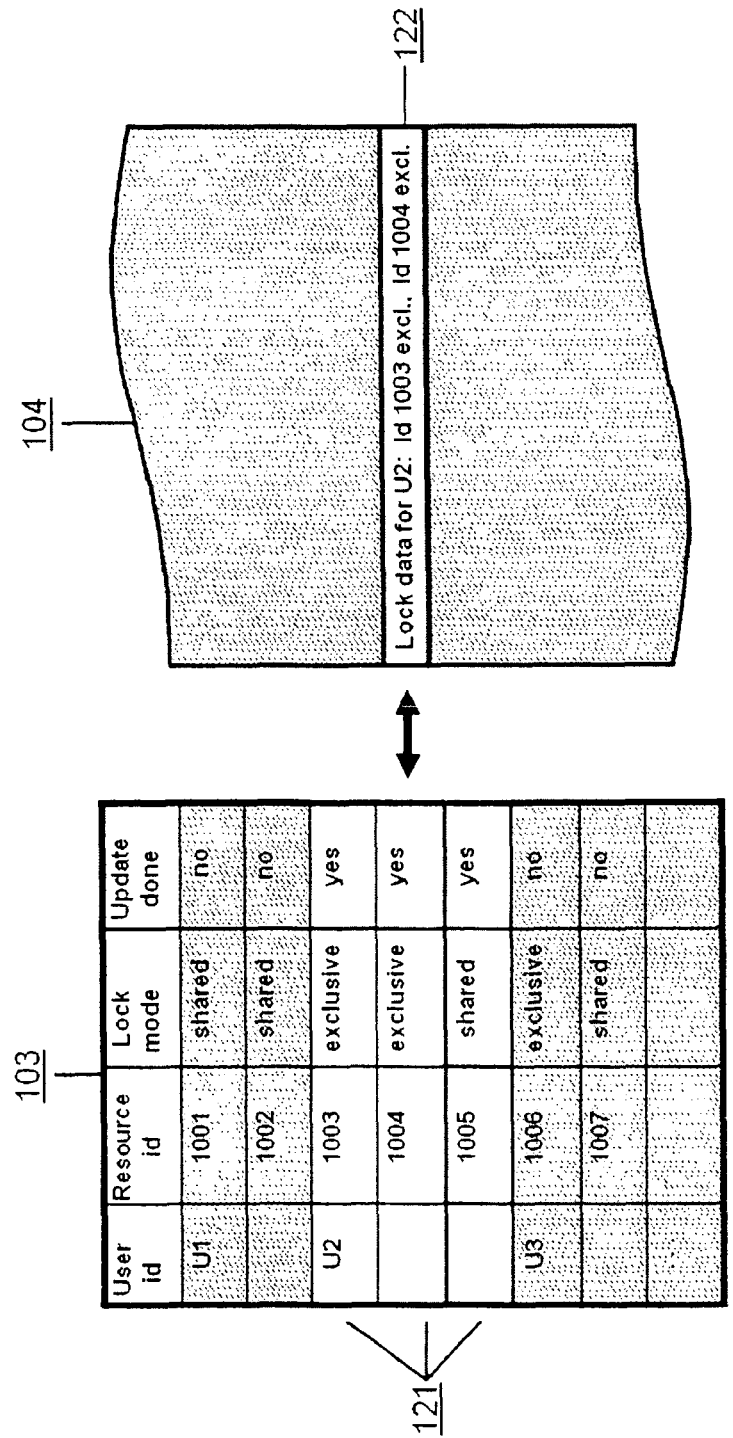
Figure 3:
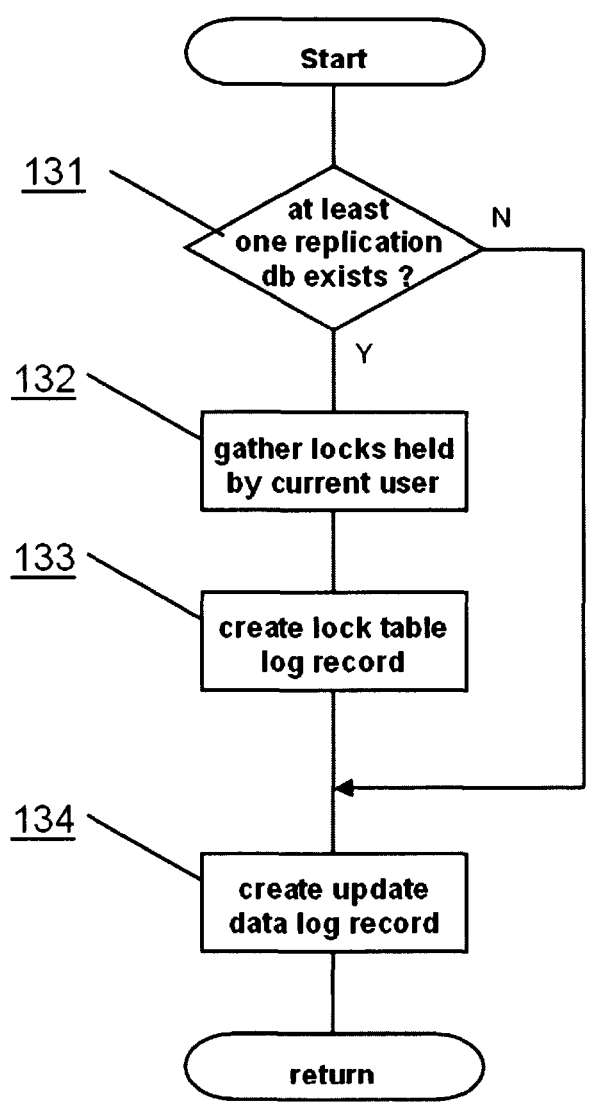
Figure 4:
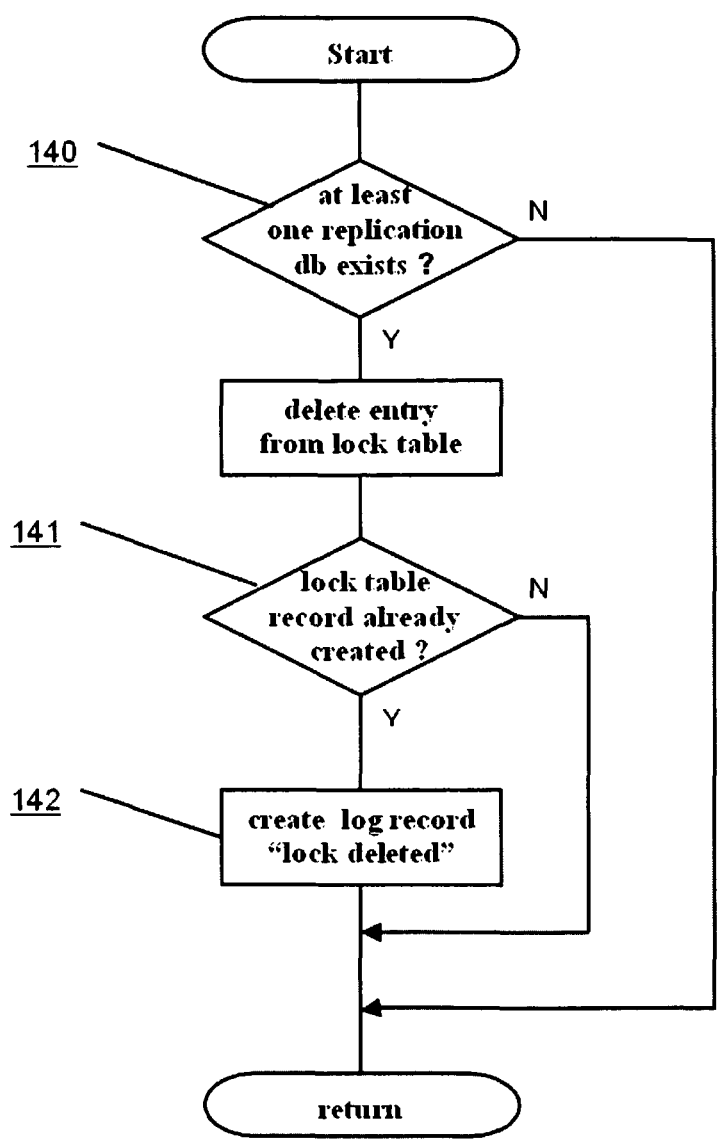
Figure 5:
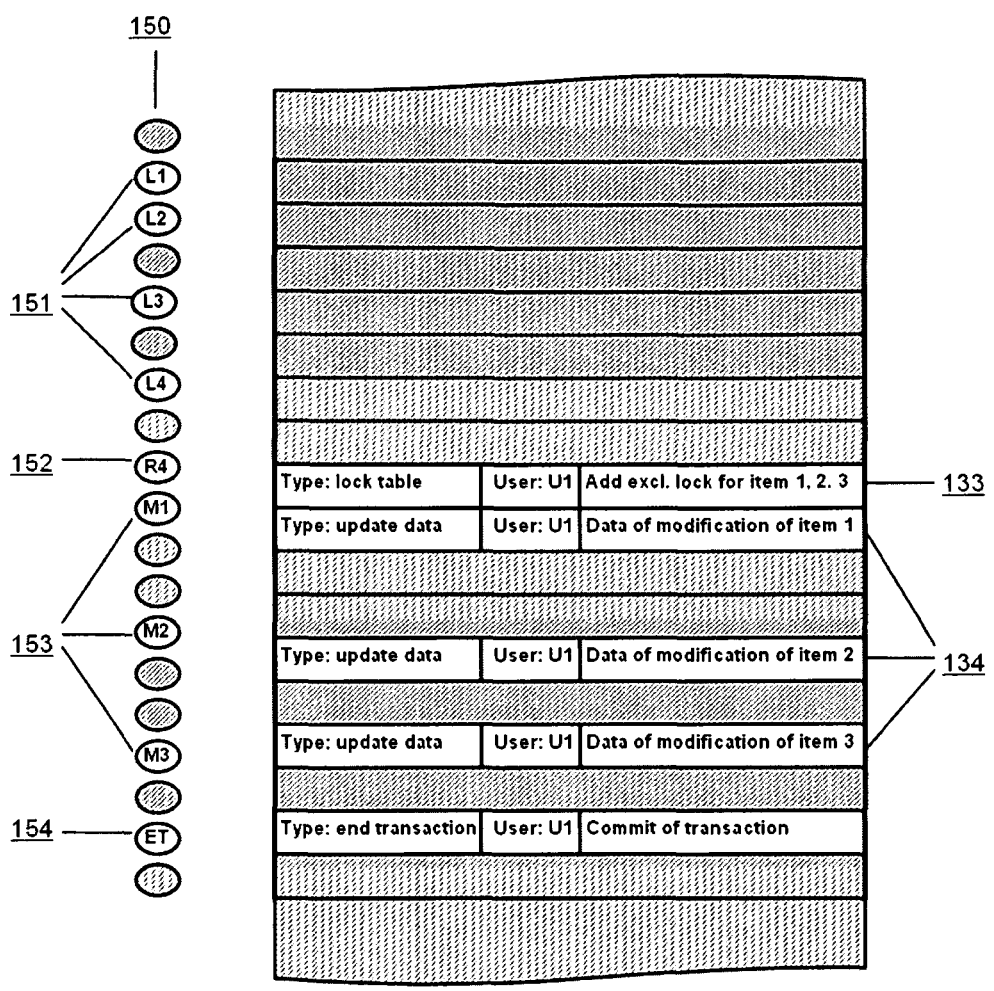
Figure 6:
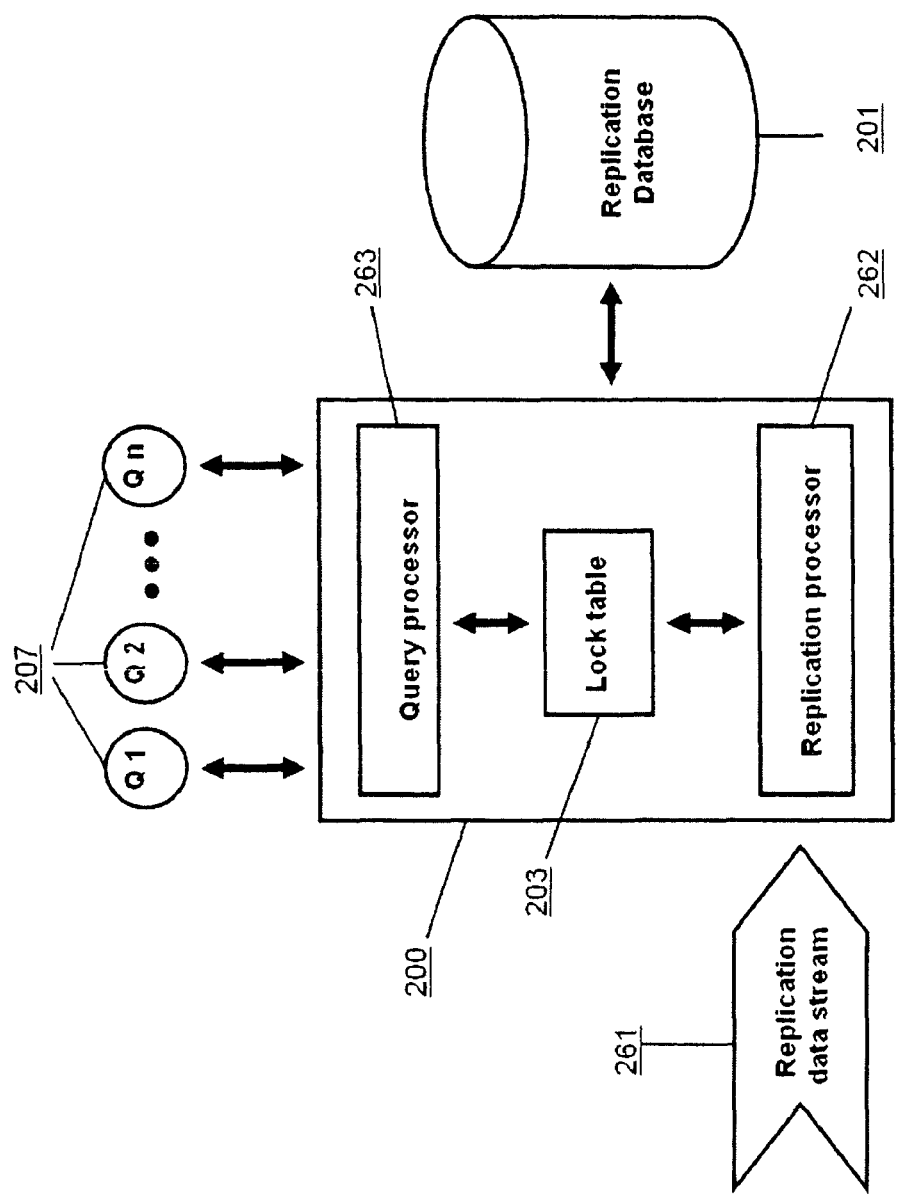

In the following detailed description, presently preferred embodiments of the invention are further described with reference to the following figures:

FIG. 1: A schematic overview of a primary database system and a replication database system according to an embodiment of the invention;

FIG. 2: An example of redo log data created from lock table entries according to an embodiment of the invention;

FIG. 3: A flowchart of adding lock data when update data is to be created on the redo log according to an embodiment of the invention;

FIG. 4: A flowchart of the creation of redo log data when locks are deleted according to an embodiment of the invention;

FIG. 5: An exemplary view of data stored in a redo log according to an embodiment of the invention;

FIG. 6: A schematic overview of the use of lock data by a replication database system according to an embodiment of the invention; and FIG. 7: A schematic overview of the creation of lock data for a replication database system according to an embodiment of the invention.

5. DETAILED DESCRIPTION

Modern database systems generally serve for processing transactions initiated by users and/or applications that operate on data items stored in at least one database of the database system. A transaction may be a read-only transaction that serves for querying certain data items from the database, or an update transaction that serves for creating, modifying and/or deleting data items of the database. A transaction may comprise one or more individual steps/operations.

Modern database systems are typically designed to ensure the known database properties ACID ('atomicity', 'consistency', 'isolation' and 'durability'; cf. http://en.wikipedia.org/wiki/ACID). Atomicity refers to the ability of a database system to guarantee that either all of the steps/operations of a transaction are performed or none of them are. The consistency property ensures that the database remains in a consistent state before the start of a transaction and after the transaction is over (whether successful or not). Isolation refers to the requirement that other steps/operations cannot access or see the data in an intermediate state during a given transaction. Lastly, durability refers to the guarantee that once a user who initiated a transaction has been notified of success of the transaction, the transaction will persist, i.e. it will not be undone.

With respect to the above-presented isolation property, it is known from the prior art to process transactions at certain isolation levels cf. http://en.wikipedia.org/wiki/Isolation_(database_systems)). For example, the isolation level 'serializable' specifies that all transactions occur in a completely isolated fashion, i.e. as if all transactions in the database system had executed serially, one after the other. The isolation level 'read committed' specifies that data retrieved by a query is not prevented from modification by other transactions (probably modifying the retrieved data). The isolation level 'read uncommitted' specifies that one transaction may see uncommitted changes made by some other transaction.

In order to support different isolation levels such as the above examples, database systems may offer the ability for transactions (and their individual steps/operations, respectively) and/or their initiating users/applications, respectively, to acquire locks on one or more data items. A lock generally restricts the access of other transactions to the corresponding data items, e.g. in the form of an exclusive lock (i.e. no other transaction is allowed to access the data items) or a shared lock (i.e. other transactions may only read, but not modify, the data items).

In the context of database replication, it is oftentimes desired to process transactions not only by the primary database system that stores the data items, but also by at least one replication database system that stores replicated data items. Processing transactions, preferably queries (i.e. read-only transactions), simultaneous to replication processing and at any isolation level is the prerequisite for using replication databases for load balancing purposes, as already presented further above. However, when data is replicated that relates to transactions that are still in progress, the data may very well change later due to updates or due to a rollback of the respective transaction. This is the case, whenever the first modification of the transaction has already been processed, but the transaction itself has not been finished (committed). Even if the transaction comprises only a single modification step, the transaction comprises two steps; the first step is the modification and the second step is the transaction end (commit). Hence, queries on this replicated data might not get a transaction-consistent view to the data, which results in incorrect results obtained by the queries (thereby violating the above-presented consistency property).

In order to ensure transaction-consistency in the context of database replication, the known database replication methods of the prior art presented further above either do not support simultaneous queries on the primary and replication database systems at all, or replication methods (e.g. based on redo log data in a traditional way containing modification data; see further below) only cannot offer other isolation levels for simultaneous queries than 'read uncommitted'. In particular, the usage of enhanced locking techniques on replication databases, such as hierarchical locking, is not possible without locking data from the originating database.

It is therefore an objective of the present invention to provide an improved way for enabling the processing of transactions, preferably queries (i.e. read-only transactions), simultaneous to replication processing and at any isolation level.

This is in one aspect achieved by storing additional information in a database system, such as the primary database system 10 shown in FIG. 1. As can be seen, the primary database system 10 comprises at least one primary database 101 and at least one redo log 102.

To allow the processing of transactions (such as the update transactions 106 and/or the read-only transactions 107 directed to the primary database system 10 in FIG. 1) by the primary database system 10 at any isolation level, locks for data items may be maintained within a lock table 103 of the primary database system 10. The lock table 103 may comprise lock entries for update transactions 106 intended to modify one or more data items of the primary database 101, as well as lock entries for read-only transactions 107 intended to query one or more data items of the primary database 101. Both types of transactions 106, 107 may be initiated by users and/or applications and the respective lock table entries may comprise a reference to the respective user/application and/or information on the respective lock.

However, if one of the steps/operations of an update transaction 106 fails for whatever reason, it may be necessary to roll-back or undo the respective update transaction, i.e. all steps/operations that have already been processed. As already explained further above, the redo log 102 of the primary database system 10 may to this end store information on the transactions 106 processed by the primary database system 10 which may then be used for a roll-back by the replication database server. Furthermore, a rollback on the primary database system may use another log, such as a journal log. If a read-only transaction 107 fails, it is necessary to release all locks obtained during this transaction.

The basic principle to enable transaction-consistent queries on a replication database 201 provided by the present invention is to add the entries of the lock table 103 needed for this purpose to the redo log 104, 102 generated by the primary database server 100.

The redo log 102 (with the added data from the lock table 103) may then be transferred to the replication database server 200 and applied there. To this end, a replication database server 200 of the replication database system 20 (cf. FIG. 1) may use the lock table records of the redo log 102 to add the locks to a lock table 203 of the replication database system 20 similar as it was done by the originating update transaction 106 on the primary database system 10. Transactions 207 to be processed by the replication database system 20 may then use locks dependent on the desired isolation level, so that there is no difference in the locks to be acquired on the primary database system 10 and the replication database system 20.

As can be seen in FIG. 1, the redo log data is transmitted via a link 105 to a replication database system 20 to be used as input data 204 for the replication database server 200 to update the replication database 201 and to maintain the lock table 203 of the replication database system 20. Using the same lock table 203 for query processing 207 allows resolving data access conflicts between the read-only transactions 207 and the replicated update transactions 106 of the primary database system 10.

According to one aspect of the present invention, when creating a record for the redo log 102 to store the modified data of an update transaction step in the primary database 101 for replication, the entries of the lock table 103 that relate to the respective update transaction 106 (e.g. to its initiating user) may be scanned for exclusive locks. A new entry in the redo log 102 may be created to store data only about these locks held by the update transaction 106 prior to creating the redo log record with the modified data of the update transaction step.

In another aspect, shared locks are not created on the redo log 102, since they cannot cause lock conflicts with users on the replication database system 20 who are preferably not allowed to execute update transactions (note that FIG. 1 shows only read-only transactions 207 processed by the replication database system 20).

Moreover, since read-only transactions 107 processed by the primary database system are preferably not visible on the redo log 102, redo log records with the lock data of such transactions need also not to be created.

Exclusive locks for data items that are not modified within the respective update transaction 106 may be deleted at any time. Subsequently, the corresponding data items may be locked by another transaction. Consequently, a redo log record with this information is preferably immediately created in order to propagate that the respective lock is no longer held by the transaction that deleted the lock. Locks that are not explicitly deleted are preferably released implicitly at the end of the respective transaction, originated by a commit or roll-back command.

Furthermore, a read-only transaction 207 directed to the replication database system 20 that requests a lock for a data item on the replication database system 20 which is already locked exclusively by the replication database server 200 currently executing an update transaction (e.g. during a replication) preferably has to wait until the lock is released.

For the replication database system 20, a different policy for deadlock resolution may be used to avoid a large offset to the primary database system 10 caused by slowing down the replication processing. In case a read-only transaction 207 is waiting for a lock held by the replication database system 20 and the replication database system 20 tries to acquire a lock already held by the read-only transaction 207, the operation of the replication database system 20 as requestor of the lock provoking the deadlock will not be aborted. On the contrary, the replication processing by the replication database system 20 preferably has a higher priority, so that the read-only transaction 207 is aborted and/or forced to be restarted when the conflicting lock is released.

As already presented above, additional lock table records on the redo log 102 are only created when needed by the replication database system 20. This is illustrated in FIG. 2, that shows exemplary entries of the lock table 103 maintained by the primary database system 10. As can be seen, the entries 121 of the lock table 103 comprise lock table entries of an update transaction initiated by a user with user ID 'U2', which are to be used to create a lock table record 122 in the redo log buffer 104 and/or the redo log 102 of the primary database system 10.

More precisely, the lock table record 122 shown in FIG. 2 comprises lock data for resources (e.g. a data items) with the resource IDs '1003' and '1004'. This lock table record 122 is preferably inserted into the redo log buffer 104 and/or the redo log 102 prior to creating an update data record. As can be further seen in FIG. 2, data for the shared lock of the resource with ID '1005' is not inserted into the lock table entry of the redo log record 122, since this information is not needed on a replication database system 20 where users are not allowed to perform update transactions and thus conflicts with shared locks are not possible.

The grey fields in FIG. 2 further show lock table entries which are not yet used for creating lock table records 122 on the redo log 104/102, either because a user 'U1' is holding only shared locks from a read-only transaction 107 or locks are from a user 'U3' that has not yet modified any data. However, if the user 'U3' (i.e. the respective transaction initiated by this user) performs an actual data modification, a lock table record 122 with lock data for the resource with ID '1006' will be created.

Consequently, the redo log 102/104 used as replication data preferably comprises only data from users with update transactions 106 that have actually modified the primary database 101. Users with read-only transactions 107 may have been also using locks to conform to a certain isolation level (see further above), however, this locking data is not required for replication processing. Therefore, creating a lock table record on the redo log is preferably delayed until a point in time when a transaction step with data modification results in creating an update data record on the redo log.

The flow chart depicted in FIG. 3 shows in more detail the steps performed by a database system of the present invention before an update data record for a transaction of a given user is created in the redo log 104: Firstly, the database system checks in step 131, preferably during start-up, whether at least one replication database system 20 allowing simultaneous queries is registered and if so, a flag is set to indicate the database system as the primary database system 10 for replication with simultaneous queries. Consequently, any database system performing this step can take the role of a primary database system. If this flag is not set (step 131), no lock data at all is required to be written to the redo log, but only the update data record (step 134) is created. This aspect further minimizes the amount of lock data written by the primary database system and thereby increases its performance. If the flag is set (decision step 131), the lock table is scanned for locks held by the user that initiated the respective transaction (step 132) to create a lock table record with one or more lock data entries (step 133) and, preferably immediately after that, the update data record (step 134) is created.

With hierarchical locking models, not only the data items modified are locked, but also additional resources may be locked that may be released before the transaction is finished. After a lock is released by a user (i.e. by its transaction), this lock may be acquired by another user (i.e. its transaction) and a lock table record is created on the redo log in case a modification is logged by an update data record. Before this lock table record is created, the lock data records on the redo log must ensure that the previous lock is removed from the lock table of the replicated database. The flow chart depicted in FIG. 4 depicts when a lock table record needs to be created when releasing a lock. Firstly, the database system checks in step 140, whether at least one replication database system 20 allowing simultaneous queries is registered and if so, a flag is set to indicate the database system as the primary database system 10 for replication with simultaneous queries. Consequently, any database system performing this step can take the role of a primary database system. If this flag is not set (step 140), no lock data at all is required to be written to the redo log, and the processing flow proceeds to the 'end' step. If a lock table record was provided for adding the lock (decision step 141), then a redo log record with the information about the released lock (step 142) is, preferably immediately, created to avoid a lock conflict on the replication database. Only if the user releasing the lock did not update any data, a lock table record with the data adding the lock is not created and a redo log record with the data that a lock was deleted is not needed.

Creating lock table records only when needed by the replication database system 20 and creating a lock table record with (multiple) lock table entries at the latest time possible shortens the time window for locks held, as demonstrated in FIG. 5. Here, a sequence of transaction steps 150 is shown as well as the redo log entries created for this transaction. More precisely, the transaction steps 150 shown in FIG. 5 comprise four lock requests 151 ('L1', 'L2', 'L3' and 'L4'), one lock release 152 ('R4'), three modification requests 153 ('M1', 'M2' and 'M3') and a transaction end step 154 ('ET'). The grey parts of the diagram represent transaction steps of other users and redo log entries created by transactions of these other users. Within the example of FIG. 5, the data to add a lock 151 for the data items with the IDs '1', '2' and '3' is put into a single lock table record 133 before creating the corresponding update data records 134 with the first modification 153 on a given data item. FIG. 5 further shows that a further lock for the data item with ID '4' was released (see the transaction step 'R4' 152) before creating the first redo log record for this transaction, thus no data for adding and releasing is to be put into a lock table record. The optimizations mentioned above require less space in the redo log and therefore less I/O processing time is needed for writing and reading the redo log data. Maintaining the locks of a user in a lock table and creating the lock table records by scanning the lock table for new locks acquired when creating the next update data log record results in the shortest time period possible for locks held by the replication database system 20.

Consequently, the data used for lock table records preferably comprises multiple lock data entries describing the resources locked in different lock modes and additional data about reapplying multiple lock entries. For further optimizations, this kind of data are preferably represented by two data structures: a basic lock table entry and a lock table entry extension. For database servers where replication databases are not registered (see above), only the basic lock table entry data structure will be used to further reduce memory consumption.

FIG. 6 shows the usage of the redo log data to replicate contents of the primary database 101. Here, the redo log data is received in an input data stream 261 by the replication processor 262 of the replication database system 20. Lock table records on the redo log are used to maintain the lock table 203 of the replication database server 200. Query users with read-only transactions 207 executed by the query processor 263 of the replication database system 20 may also use the lock table 203.

Figure 7:
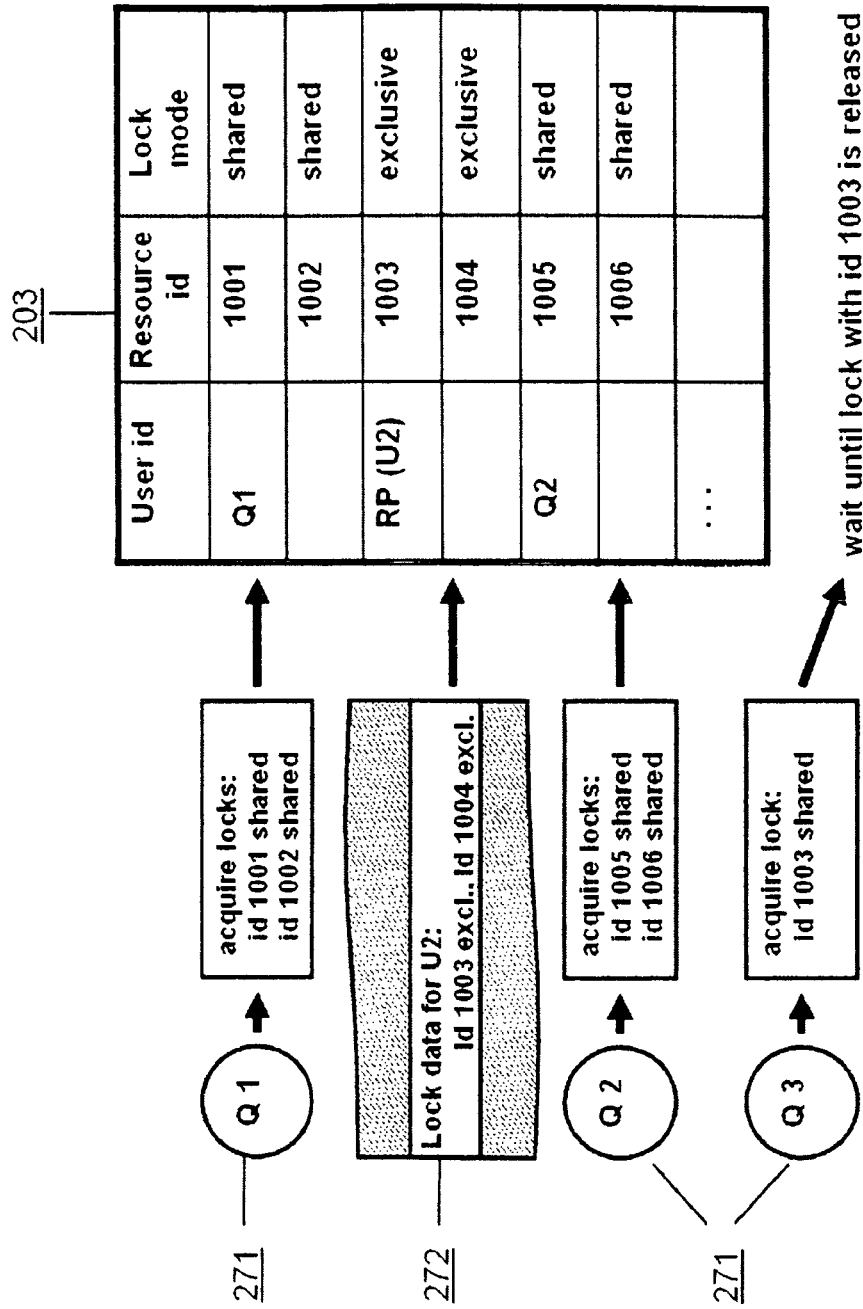

If a transaction is trying to acquire a lock that is already held by the replication processor 262, the respective transaction (the 'requestor' of the lock) is put into a waiting state. As an example, FIG. 7 shows a sequence of transaction steps 271 executed by the query processor 263 and a transaction step 272 from the redo log to be replicated resulting in the creation of entries in the lock table 203 of the replication database server 200. With this example, a query user 'Q3' tries to acquire a lock for a resource with the ID '1003' which is already held by the replication processor 262, thus the user 'Q3' has to wait until the lock for the resource with ID '1003' is released.

Deadlock situations that might occur with query users and the replication processor are preferably resolved in favour of the replication processor to avoid replication processing to be slowed down, with the effect that other locks already held by the replication processor to replicate transactions running in parallel could create lock conflicts with other query users. To this end, the read-only transactions of query users in case of a deadlock are aborted. This approach is appropriate to achieve the best overall performance.

As already presented further above, the lock data stored within redo log records may comprise different lock types, such as explicit locks, shared locks and/or intention lock types. Additional lock operations may be provided, such as upgrading a lock to stronger lock or downgrading to a weaker lock. Creating lock table records on the redo log for upgrading locks may be performed similar as adding locks (see above). Downgrading a lock may be performed similar to deleting a lock.

In summary, the above embodiment of the present invention enables transaction consistent queries on a replication database in an especially efficient way by supplementing the redo log data 102/104 (i.e. the replication data) with locking data, preferably from the lock table 103. The primary database server 100 reduces the amount of lock data to be added to the redo log to a minimum by filtering only those locks which are necessary to process the updates to be replicated. These locks are preferably exclusive locks of update transactions 106. Shared locks and locks of read-only transactions 107 on the primary database 101 and exclusive locks within update transactions 106 without update processing are not included in the redo log data 104, 102. In case no replication database system 20 is registered with a primary database system 10, preferably no locking information at all is included in the redo log. By using the additional locking data, the replication database server 200 of a replication database 201 may effectively offer the same lock modes and isolation levels as the primary database server 100 of the primary database 10 for queries (read-only transactions 207) running in parallel to the replication processing.

It will be appreciated that the example database systems described herein may include any suitable combination of programmed logic circuitry (e.g., hardware, software, firmware, and/or the like). For example, the example database systems described herein may include a processor that helps execute instructions and/or commands. In certain example embodiments, the data records, logs, and the like, may be stored in a suitable storage location (such as, for example, one or more databases, files, or other tangible and/or non-transitory memory locations). It will be appreciated that certain example embodiments may comprise a non-transitory computer readable storage medium storing tangible instructions that, when executed by a processor (e.g., of one or more of the example database systems described herein), perform the above-described method steps. It also will be appreciated that the example methods disclosed herein may be executed, in whole or in part, by one or more of the example database systems and/or a processor thereof.

The invention claimed is:

1. A method for asynchronously replicating one or more data items of a primary database system in a transaction consistent manner, the method being performed by the primary database system and comprising:
    storing database lock data, relating to at least one lock on the one or more data items of the primary database system, in a transaction log including information on transactions processed by the primary database system, wherein the stored database lock data in the transaction log includes only locks requested by one or more update transactions, processed by the primary database system, that modify the one or more data items stored in the primary database system; and
    providing replication data to at least one replication database system, the replication data being usable for replicating the one or more data items of the primary database system by the at least one replication database system, the replication data comprising the transaction log including the database lock data in order to support simultaneous queries to the primary and replication database systems and to support rolling-back the replicated one or more data items in the at least one replication database system.

2. The method of claim 1, wherein the database lock data is added to the replication data only if the related at least one lock is an exclusive lock.

3. The method of claim 1, wherein the database lock data is added to the replication data only if the one or more data items related to the at least one lock have been modified during a processing of the update transaction by the primary database system.

4. The method of claim 1, wherein the database lock data is included in the replication data only if at least one replication database system, registered at the primary database system, is configured for processing queries during the replication of the one or more data items of the replication database system based on the replication data received from the primary database system.

5. A non-transitory computer readable storage medium storing a computer program comprising instructions that when executed implement a method according to claim 1.

6. The method of claim 1, wherein the primary database system is configured to process further transactions in parallel with, and independent from, replication processing.

7. The method of claim 1, wherein the at least one replication database system performs load balancing.

8. The method of claim 7, wherein the at least one replication database system is configured to serve read-only transactions simultaneously for the primary and replication database systems.

9. The method of claim 1, wherein the lock data comprises one or more lock modes corresponding to a permission type for utilizing the replication data.

10. The method of claim 1, wherein the method further comprises:
    storing a lock table including a plurality of lock records with each lock record including one or more lock entries, each lock entry including a reference to an identification of user initiating the transaction, identification of data items, and lock mode for the data items;
    selecting, based on the identification of the user, the identification of data items, and/or the lock mode, lock entries that are needed for replicating the one or more data items of the primary database system by the at least one replication database system, wherein lock entries that are not needed for replicating are not selected; and
    including the selected lock entries in the database lock data, for the at least one replication database system to avoid deadlock situations by granting privilege to locks of the selected lock entries over user queries that create lock conflicts and aborting the user queries that create lock conflicts.

11. A method for asynchronously replicating one or more data items of a primary database system by a replication database system in a transaction consistent manner, the method being performed by the replication database system and comprising:
    receiving replication data from the primary database system and replicating the one or more data items of the primary database system in accordance with the replication data, the replication data comprising a transaction log including information on transactions processed by the primary database system and including database lock data relating to at least one lock on the one or more data items of the primary database system in order to support simultaneous queries to the primary and replication database systems, wherein the database lock data in the transaction log includes only locks requested by one or more update transactions, processed by the primary database system, that modify the one or more data items stored in the primary database system; and
    processing one or more queries for data items in the replication database system, while asynchronously replicating the one or more data items in the replication database system based on the information on transactions processed by the primary database system and the database lock data included in the replication data.

12. The method of claim 11, wherein the database lock data relates to at least one exclusive lock on the one or more data items, wherein at least one read-only transaction processed by the at least one replication database requests a second lock on the one or more data items and wherein the method comprises the step of postponing a processing of the at least one read-only transaction until the at least one exclusive lock is released by the replication database system.

13. The method of claim 12, wherein the replication database system requests a third lock for replication purposes on the one or more data items, wherein the third lock is already held by the at least one read-only transaction and further comprising forcing the at least one read-only transaction to release the third lock.

14. A non-transitory computer readable storage medium storing a computer program comprising instructions that when executed implement a method according to claim 11.

15. The method of claim 11, wherein processing the one or more queries for data items in the replication database system includes processing one or more queries on data items that are locked based on the database lock data at the time the one or more queries are received.

16. The method of claim 11, wherein processing the one or more queries for data items in the replication database system includes processing read-only transactions on data items in the replication database system simultaneous to the replication processing in the replication database system based on the replication data.

17. A primary database system, comprising:
a primary database server comprising at least one processor configured to:
store database lock data, relating to at least one lock on the one or more data items of the primary database system, in a transaction log including information on transactions processed by the primary database system, wherein the stored database lock data in the transaction log includes only locks requested by one or more update transactions, processed by the primary database system, that modify the one or more data items stored in the primary database system; and
send replication data to at least one replication database system to be used for asynchronously replicating the one or more data items of the primary database system by the at least one replication database system in a transaction consistent manner, wherein the replication data comprises the transaction log including the database lock data relating to the at least one lock on the one or more data items in order to support simultaneous queries to the primary and replication database systems and to support rolling-back the replication data in the at least one replication database system based on the information on transactions processed by the primary database system and the database lock data.

18. The primary database system of claim 17, wherein the at least one processor of the primary database server is further configured to add the database lock data to the replication data sent to the at least one replication database system, only if the related at least one lock is an exclusive lock.

19. A replication database system, comprising:
a replication database server comprising at least one processor configured to:
receive replication data from a primary database system and asynchronously replicating one or more data items of the primary database system in accordance with the replication data in a transaction consistent manner, wherein the replication data comprises a transaction log including information on transactions processed by the primary database system and including database lock data relating to at least one lock on the one or more data items of the primary database system in order to support simultaneous queries to the primary and replication database system, wherein the database lock data in the transaction log includes only locks requested by one or more update transactions, processed by the primary database system, that modify the one or more data items stored in the primary database system; and
processing one or more queries for data items in the replication database system, while asynchronously replicating the one or more data items in the replication database server based on the information on transactions processed by the primary database system and the database lock data included in the replication data.

20. The replication database system of claim 19, wherein the database lock data relates to at least one exclusive lock on the one or more data items, wherein at least one read-only transaction processed by the at least one replication database requests a second lock on the one or more data items, and wherein the replication database server is further configured to postpone the processing of the at least one read-only transaction until the at least one exclusive lock is released by the replication database system.

21. A system comprising:
a primary database system including at least one processor configured to:
store database lock data, relating to at least one lock on the one or more data items of the primary database system, in a transaction log including information on transactions processed by the primary database system, wherein the stored database lock data in the transaction log includes only locks requested by one or more update transactions, processed by the primary database system, that modify the one or more data items stored in the primary database system; and
send replication data to at least one replication database system to be used for asynchronously replicating the one or more data items of the primary database system by the at least one replication database system in a transaction consistent manner,
wherein the replication data comprises the transaction log including the database lock data in order to support simultaneous queries to the primary and replication database systems and to support rolling-back the replication data in the at least one replication database system; and
at least one replication database server comprising at least one processor configured to:
receive the replication data including the transaction log from the primary database system;
asynchronously replicate the one or more data items of the primary database system in accordance with the replication data in a transaction consistent manner;
while asynchronously replicate the one or more data items, processing one or more queries for data items in the replication database system; and
roll back the replication data in the replication database server based on the information on transactions processed by the primary database system and the database lock data.

* * * * *